(12) United States Patent
Andrivon et al.

(10) Patent No.: US 11,947,116 B2
(45) Date of Patent: Apr. 2, 2024

(54) METHOD FOR DISPLAYING IMAGES ON A FLEXIBLE DISPLAY DEVICE IN A HEAD-MOUNTABLE DEVICE AND CORRESPONDING APPARATUS

(71) Applicant: InterDigital VC Holdings, Inc., Wilmington, DE (US)

(72) Inventors: Pierre Andrivon, Liffre (FR); Franck Galpin, Thorigne-Fouillard (FR); Fabrice Urban, Thorigne Fouillard (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 145 days.

(21) Appl. No.: 17/440,911

(22) PCT Filed: Mar. 18, 2020

(86) PCT No.: PCT/US2020/023304
§ 371 (c)(1),
(2) Date: Sep. 20, 2021

(87) PCT Pub. No.: WO2020/197878
PCT Pub. Date: Oct. 1, 2020

(65) Prior Publication Data
US 2022/0155596 A1 May 19, 2022

(30) Foreign Application Priority Data
Mar. 26, 2019 (EP) .................................... 19305383

(51) Int. Cl.
*G02B 27/01* (2006.01)
(52) U.S. Cl.
CPC .... *G02B 27/0172* (2013.01); *G02B 2027/011* (2013.01); *G02B 2027/0123* (2013.01); *G02B 2027/014* (2013.01)

(58) Field of Classification Search
CPC .......... G02B 27/0172; G02B 2027/011; G02B 2027/0123; G02B 2027/014
See application file for complete search history.

(56) References Cited

U.S. PATENT DOCUMENTS 9,769,465 B2 9/2017 Seo et al.
2004/0227703 A1 11/2004 Lamvik et al.
(Continued)

FOREIGN PATENT DOCUMENTS

WO WO 2006003600 A1 1/2006
WO WO 2016209941 A1 12/2016
(Continued)

OTHER PUBLICATIONS

Xiao et al., "Augmenting the Field-of-View of Head-Mounted Displays with Sparse Peripheral Displays", Association for Computing Machinery (ACM), 2016 CHI Conference on Human Factors in Computing Systems, San Jose, California, USA, May 7, 2016, 12 pages.

(Continued)

*Primary Examiner* — Brent D Castiaux
(74) *Attorney, Agent, or Firm* — Volpe Koenig

(57) ABSTRACT

A method and an apparatus are defined for displaying images on a flexible display in a head-mountable device (HMD). One or more flexible display devices may be inserted in the HMD. The one or more flexible display devices may be constrained by the HMD to take a particular curved form and wrap the field of view (FOV) of images displayed on the one or more flexible display devices for an improved user experience. The display surface of the one or more flexible displays may be divided in display areas, the display areas corresponding to a focus area and a peripheral FOV. Image processing may be differentiated according to display area.

10 Claims, 15 Drawing Sheets

(56) References Cited

U.S. PATENT DOCUMENTS

| | | |
|---|---|---|
| 2008/0174659 A1 | 7/2008 | Mcdowall |
| 2009/0040296 A1 | 2/2009 | Moscato |
| 2014/0266990 A1 | 9/2014 | Makino et al. |
| 2015/0219902 A1* | 8/2015 | Kim .................. G02B 27/0176 345/8 |
| 2017/0115489 A1 | 4/2017 | Hu et al. |
| 2017/0187855 A1* | 6/2017 | Hoellwarth ........ G02B 27/0093 |
| 2017/0285344 A1 | 10/2017 | Benko et al. |

FOREIGN PATENT DOCUMENTS

| | | |
|---|---|---|
| WO | WO 2017076232 A1 | 5/2017 |
| WO | WO 2018213812 A2 | 11/2018 |

OTHER PUBLICATIONS

Turban et al., "Extrafoveal Video Extension for an Immersive Viewing Experience", IEEE Transactions on Visualization and Computer Graphics, vol. 23, No. 5, May 2017, pp. 1520-1533.

Machine Translation for WO 2017076232 A1, entitled "Configuration Method and Device of Virtual Reality Equipment Display Screen", 19 pages.

Konieczny et al., "A Handheld Flexible Display System", IEEE Visualization, Minneapolis, Minnesota, USA, Oct. 23, 2005, pp. 591-597.

* cited by examiner

METHOD FOR DISPLAYING IMAGES ON A FLEXIBLE DISPLAY DEVICE IN A HEAD-MOUNTABLE DEVICE AND CORRESPONDING APPARATUS

This application claims the benefit, under 35 U.S.C. § 371 of International Application PCT/US2020/023304, filed Mar. 18, 2020, which was published in accordance with PCT Article 21(2) on Oct. 1, 2020, in English, and which claims the benefit of European Patent Application No. 19305383.2, filed Mar. 26, 2019.

FIELD

The present disclosure generally relates to the field of Head-Mountable Devices.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Head-Mountable Displays or Head-Mountable Devices (HMDs) give a user an impression of immersion in a three-dimensional (3D) environment and are used, for example, in Augmented and Virtual Reality (AR/VR) systems. Medium-end to high-end HMDs include one display (monocular HMD) or two displays, e.g., one for each eye (binocular HMD). These displays typically have a curvature so as to provide minimal visual distortions and to obtain a user experience comparable to real-world vision. When the images to be rendered on the HMD are originally meant to be displayed on a display device having a flat surface, image processing may be used in order to adapt the image(s) to the curved display(s) of the HMD in order to avoid visual artefacts which may adversely impact the user experience and may cause discomfort. The image processing is particular to each HMD and is provided with the HMD. Low-cost HMD's may include a frame that may be provided with an arrangement for receiving a mobile phone ('smartphone-based HMD'). The mobile phone may have a flat display surface. The use of a flat display surface for an HMD brings about a distorted image, which may be at least partly compensated by processing the image for display, e.g., by deforming the image as if it were warped on an imaginary curved surface. However, the quality of the user experience remains below that of the medium- to high-end HMD which includes a fixed, curved display. The emergence of mobile devices with flexible displays ('flexible display devices') creates an opportunity to improve the user experience for low-cost HMDs.

SUMMARY

According to one aspect of the present disclosure, there is provided a method for rendering images on at least one flexible display device in a head-mountable device. The method comprises configuring image processing features for images to be rendered on the at least one flexible display device as a function of a first display area of the at least one flexible display device and a second display area of the at least one flexible display device on which the images are to be rendered, the second display area surrounding the first display area, and the first display area corresponding to a focal field of view and the second display area corresponds to a peripheral field of view; and rendering images on the first and second display areas of at least one flexible display device according to the configured image processing features.

According to a further aspect of the method, the head-mountable device comprise an opening configured to receive the at least one flexible display device for inserting the at least one flexible display device into the head-mountable device, the head-mountable device constraining the at least one flexible display device to take a curved form when inserted into the head-mountable device.

According to a further aspect of the method, the method further comprises determining dimensions and position of the first display area and of the second display area as a function of dimensions of the at least one flexible display device and of the curved form.

According to a further aspect of the method, the image processing features comprise at least one of: applying temporal and/or spatial higher resolution image processing to images to be rendered on the first display area than for images to be rendered on the second display area; applying a warping transformation to images to be rendered on the first display area as a function of the curved form, to correct a distortion caused by lenses in the head-mountable device, and not applying the warping transformation to images to be rendered in the second display area; extending images to be rendered on the first area to the second area, by extraction of image features from outer display zones of the images to be rendered on the first area.

According to a further aspect of the method, the dimensions and position of the first display area and of the second display area are further a function of: a focal length of a set of lenses comprised in the head-mountable device; a focal center distance between the set of lenses; an eye to display distance; a display to lens distance; an interpupillary distance from a user of the head-mountable device.

According to a further aspect of the method, the interpupillary distance is measured by the at least one flexible display device based on a sensor element in the at least one flexible display device.

According to a further aspect of the method, properties of the head-mountable device are obtained by the at least one flexible display device by reading a Quick Response code associated with the head-mountable device.

According to a further aspect of the method, properties of the head-mountable device are obtained by the at least one flexible display device by reading a near-field communication tag incorporated in the head-mountable device.

The present disclosure also relates to a flexible display device for rendering images when inserted in a head-mountable device, the flexible display device comprising a processor configured to configure image processing features for images to be rendered on the flexible display as a function of a first display area of the flexible display device and as a function of a second display area of the flexible display device on which the images are to be rendered, the second display area surrounding the first display area, and the first display area corresponding to a focal field of view and the second display area corresponds to a peripheral field of view; and to render images on the first and second display areas of the flexible display device according to the configured image processing features.

According to a further aspect of the flexible display device, the head-mountable device comprising an opening configured to receive the flexible display device for inserting the flexible display device into the head-mountable device, the head-mountable device constraining the flexible display device to take a curved form when inserted into the HMD, the processor being further configured to determine dimensions and position of the first display area and of the second display area as a function of dimensions of the at least one flexible display device and of the curved form.

According to a further aspect of the flexible display device, the processor is further configured to apply at least one of the following image processing features: to apply higher spatial and/or temporal resolution image processing to images to be rendered on the first display area than for images to be rendered on the second display area; to apply a warping transformation to images to be rendered on the first display area as a function of the curved form, to correct a distortion caused by lenses in the head-mountable device, and not apply the warping transformation to images to be rendered on the second display area; to extend images to be rendered on the first area to the second area, by extraction of image features from outer display zones of the images to be rendered on the first area.

According to a further aspect of the flexible display device, the processor is further configured to obtain an interpupillary distance from a user of the head-mountable device for determining a center position of the first area.

According to a further aspect of the flexible display device, the processor is further configured to obtain the interpupillary distance from a sensor element in the flexible display device.

According to a further aspect of the flexible display device, the processor is further configured to determine the form of the curvature once the flexible display device is inserted in the head-mountable device.

According to a further aspect of the flexible display device, the processor is further configured to obtain properties of the head-mountable device from a Quick Response code reader in the flexible display device, reading a Quick Response code associated with the head-mountable device.

According to a further aspect of the flexible display device, the flexible display device is a mobile communication device.

According to a further aspect of the flexible display device, the mobile communication device is a smart phone.

BRIEF DESCRIPTION OF THE DRAWINGS

More advantages of the present disclosure will appear through the description of particular, non-restricting embodiments. To describe the way the advantages of the present disclosure can be obtained, particular descriptions of the present principles are rendered by reference to specific embodiments thereof which are illustrated in the appended drawings. The drawings depict exemplary embodiments of the disclosure and are therefore not to be considered as limiting its scope. The embodiments described can be combined to form particular advantageous embodiments. In the following figures, items with same reference numbers as items already described in a previous figure will not be described again to avoid unnecessary obscuring the disclosure. The embodiments will be described with reference to the following drawings in which:

FIG. 1b is a top view of the prior art HMD of FIG. 1a.

FIG. 2b is a top view of the same HMD of FIG. 2a.

It should be understood that the drawings are for purposes of illustrating the concepts of the disclosure and are not necessarily the only possible configuration for illustrating the disclosure.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1A:
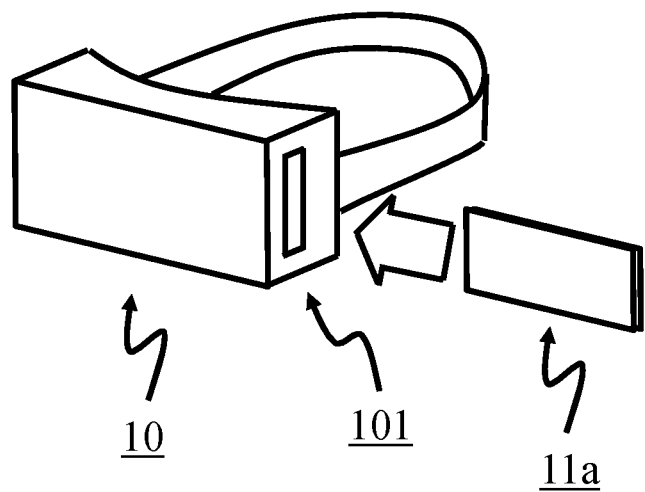
FIG. 1a is a prior art HMD with a slot for inserting a display device.
Figure 1B:
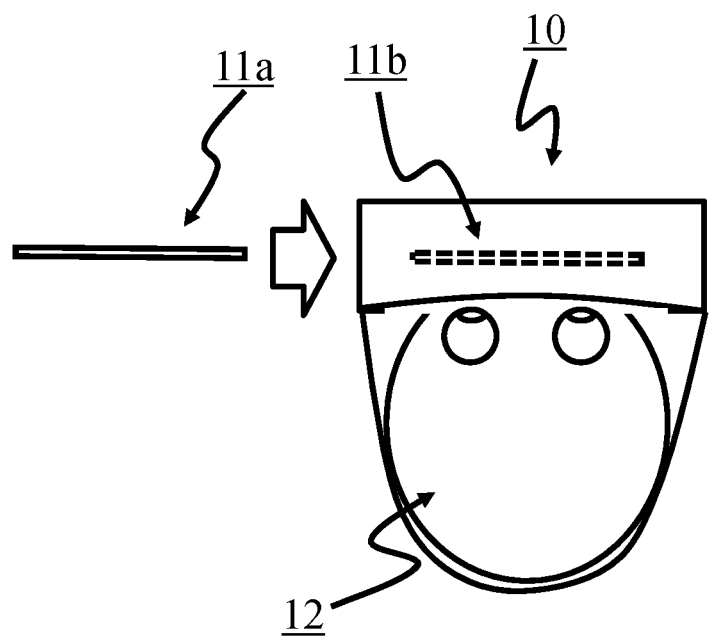

FIG. 1a is an HMD 10 with a slot 101 for receiving a display device 11a. The display device 11a has an essentially flat and rigid display. The display device 11a is, for example, a mobile communication device, such as a smartphone. FIG. 1b is the same HMD 10 seen from above, as worn by a person 12. Display device 11a can be inserted in slot 101 and is shown in inserted position 11b. Examples of like HMDs are Google Cardboard and Daydream models.

Figure 2A:
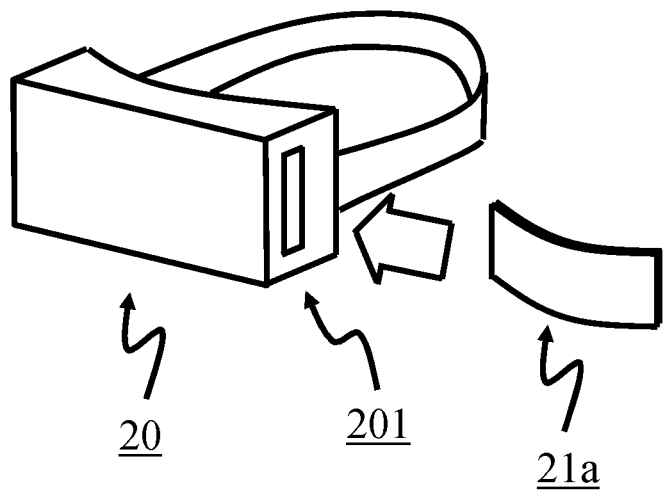
FIG. 2a is an HMD according to an embodiment.
Figure 2B:
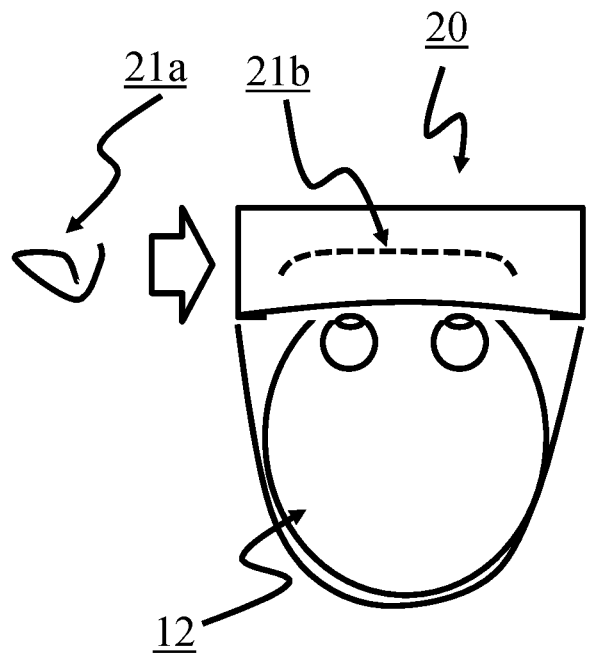

FIG. 2a is an HMD 20 according to an embodiment. A flexible display device 21a may be inserted in slot 201. FIG. 2b is a top view of the same HMD 20, worn by a person 12. Flexible display device 21a may be inserted in slot 201 and is shown in inserted position 21b. Flexible display device 21a is, for example, a flexible mobile communication device, such as a smartphone. According to embodiments, instead of having a slot 201 on one of its sides, the HMD 20 may have slots on each side, and/or a slot on its top or bottom. According to an embodiment, the HMD 20 may be free of slots in which case the flexible display device 21a may be attached to the HMD 20 having an opening or trap for receiving the flexible display device 21a. As can be observed in FIG. 2b, flexible display device 21a is constrained to take a curved form when in inserted position 21b. As will be discussed further on, this curved form contributes to improving user experience of images displayed in the peripheral FOV of user 12.

Figure 3A:
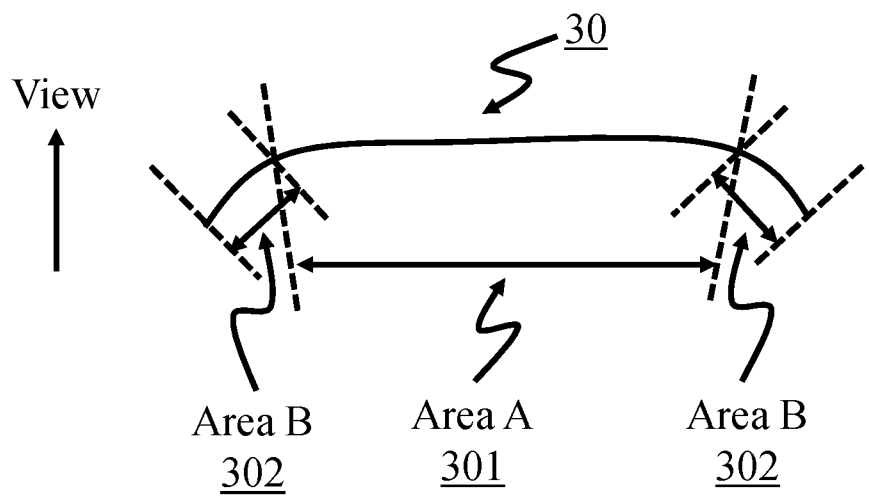
FIG. 3a-c is an embodiment wherein an HMD receives a single flexible display, which may take a curved form.
Figure 3B:
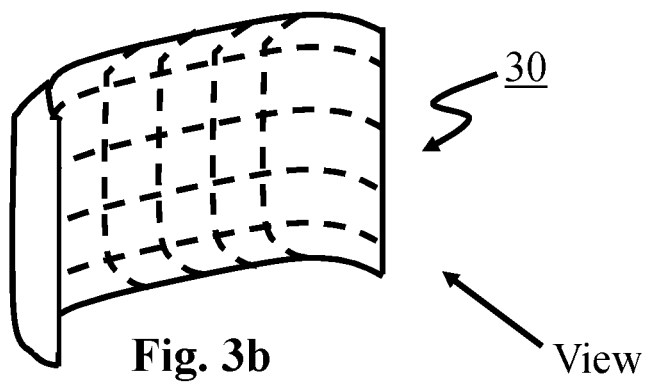
Figure 3C:
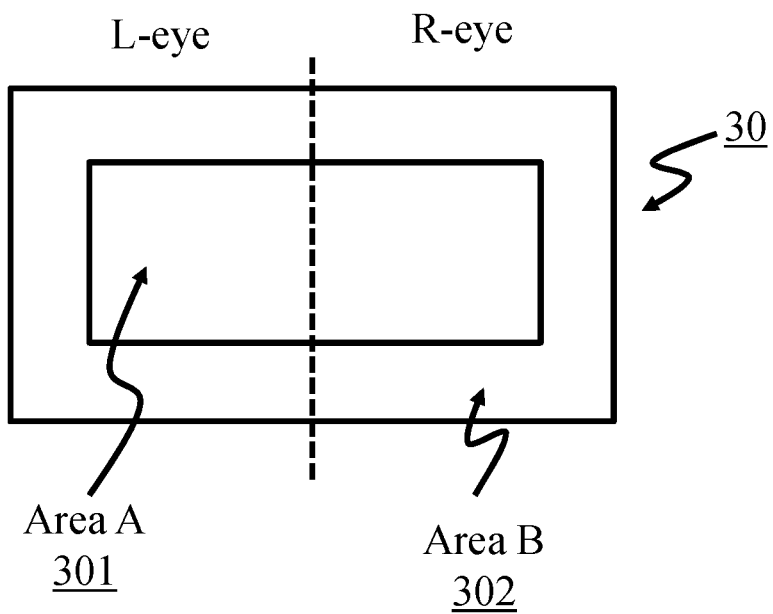

FIG. 3a-c is an embodiment wherein an HMD receives a single flexible display 30, which may take a curved (e.g., concave) form as shown in FIGS. 3a/b once inserted in an HMD according to an embodiment. The display zone of display 30 may be divided in multiple areas as shown, i.e., a display area A 301 and a display area B 302. Area B 302 may be the area defined by the curved display zone that is in the peripheral FOV, while area A 301 may be defined as the (essentially) non-curved or ((essentially) flat) display zone that is not in the peripheral FOV. A further definition of areas A and B can be found in FIGS. 12a and 12b.

Figure 4A:
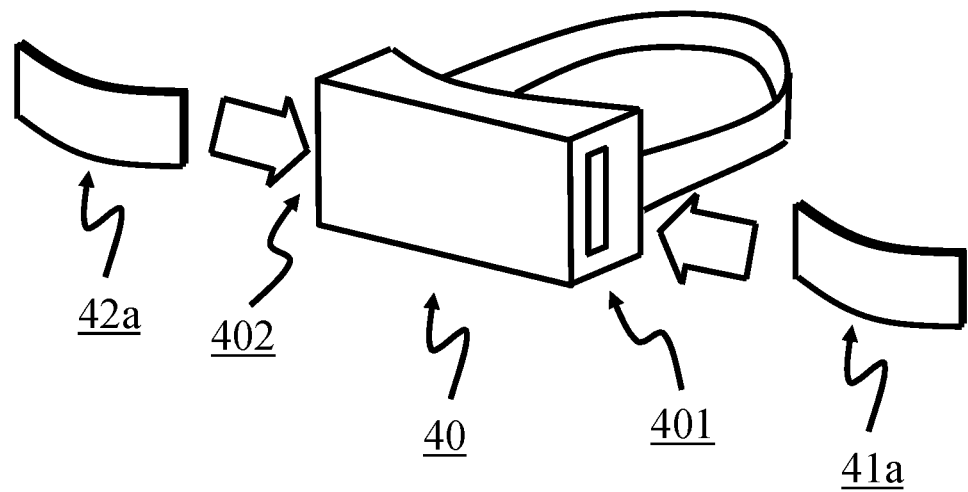
FIG. 4a/b is an embodiment in which an HMD is configured to receive two flexible display devices.
Figure 4B:
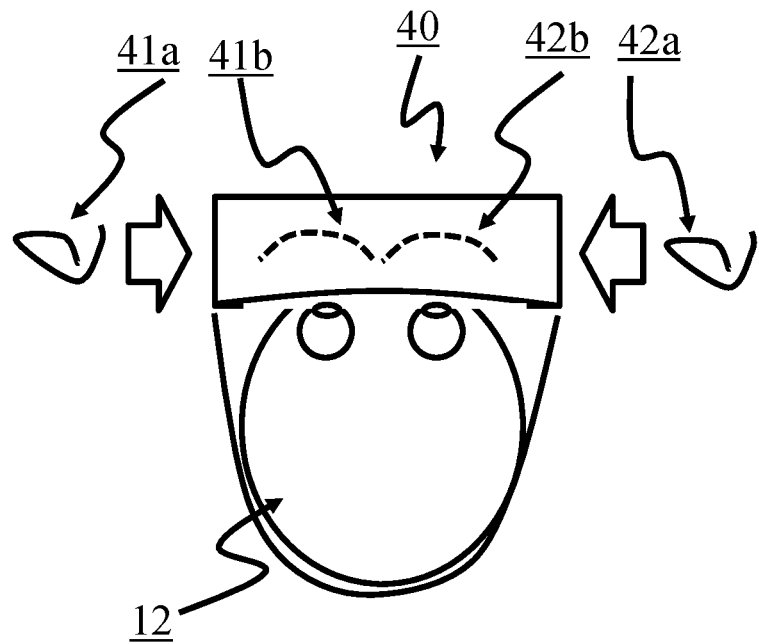

FIG. 4a/b is an embodiment in which an HMD 40 is configured to receive two flexible display devices 41a and 42a. FIG. 4b is the same HMD 40 seen from above as worn by a user 12. Flexible displays 41a and 42a are shown in their respective inserted positions 41b and 42b.

Figure 5A:
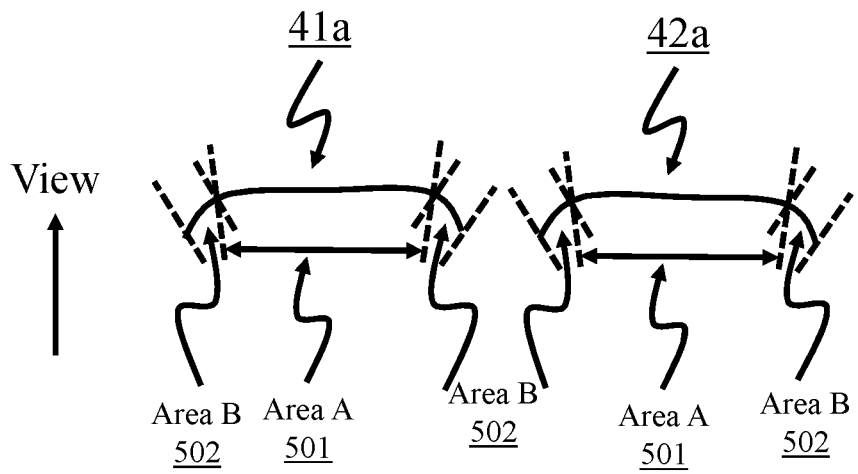
FIGS. 5a-c illustrate the use of multiple flexible displays such as in the HMD of FIG. 4a/b, and in particular illustrate the definition of display zones in display areas in such embodiment.
Figure 5B:
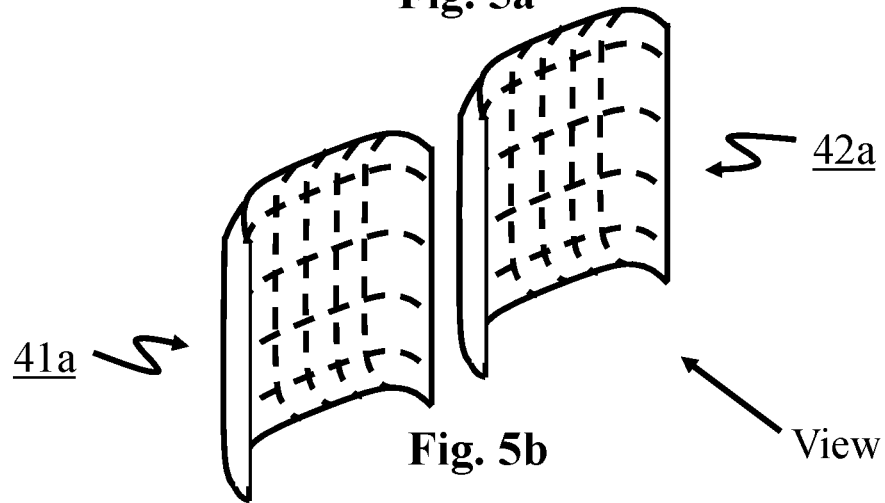
Figure 5C:
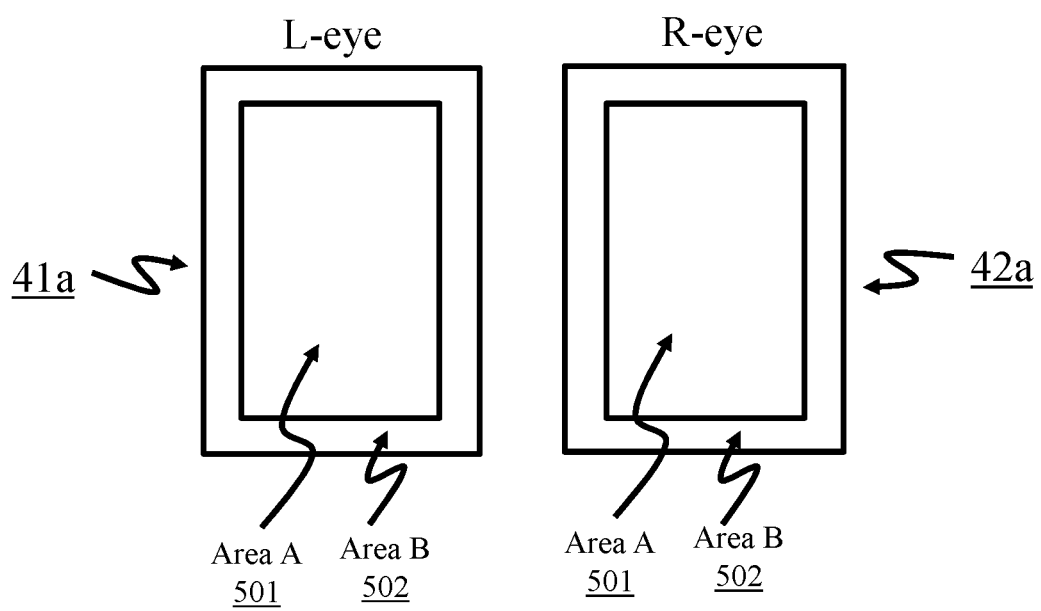

FIGS. 5a-c illustrate the use of multiple flexible displays such as in the HMD 40 of FIG. 4a/b, and in particular illustrate the definition of display zones in display areas in such embodiment. Each of the two flexible displays 41a and 42a may take the curved (e.g., concave) form of FIG. 5b once inserted in the HMD 40. Areas A 501 and area B 502 are defined in the display zone of each flexible display 41a and 42a, where area A 501 is defined as an (essentially) non-curved/flat area that is not in the peripheral FOV of user 12, while area B 502 is defined as an (essentially) curved area that is in the peripheral FOV of user 12.

Figure 6A:
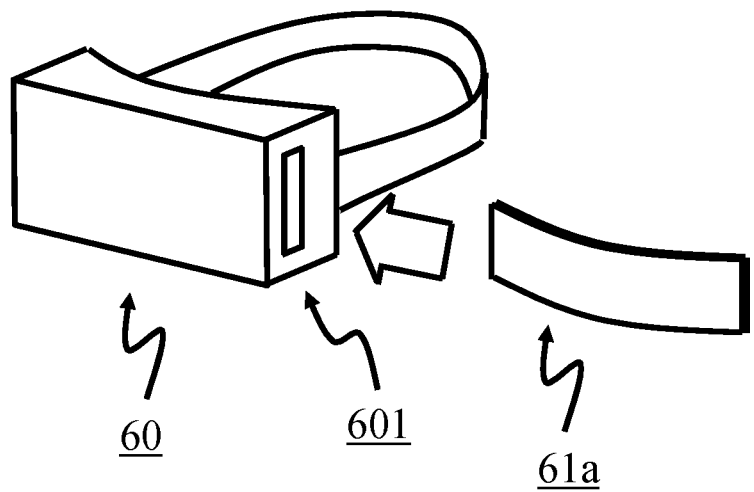
FIGS. 6a and 6b show an embodiment in which a single flexible display is used and is constrained by an HMD to take a double curved form once inserted.
Figure 6B:
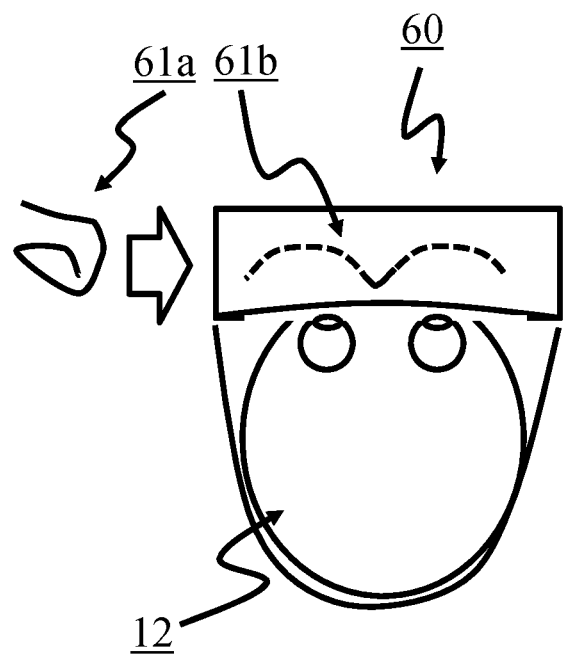

FIGS. 6a and 6b show an embodiment in which a single flexible display 61a is used and is constrained by HMD 60 to take a double curved (e.g., concave) form 61b once inserted in the HMD 60.

Figure 7A:
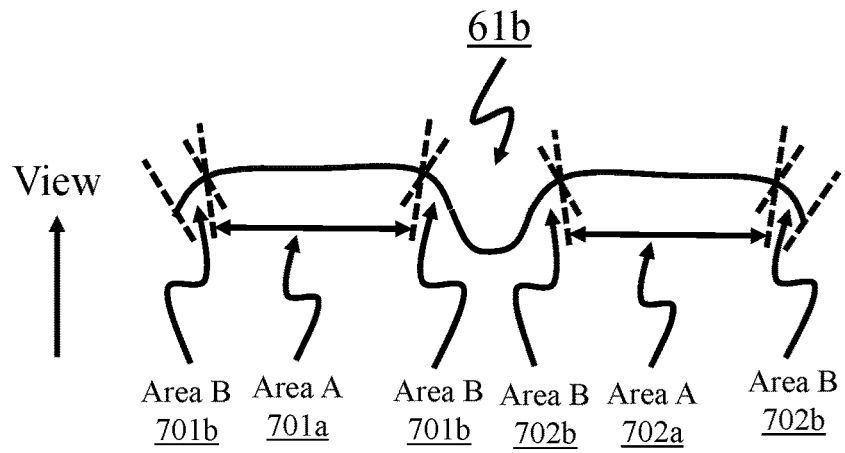
FIGS. 7a-c show how areas and are defined in the display zone of the single flexible display.
Figure 7B:
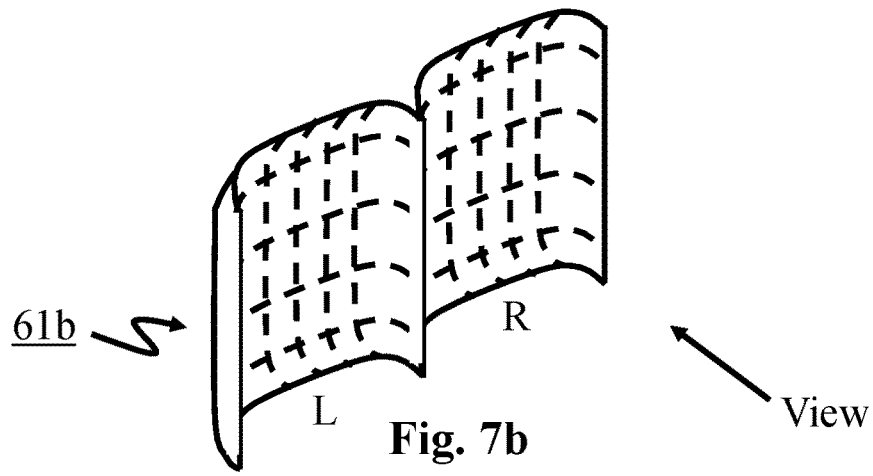
Figure 7C:
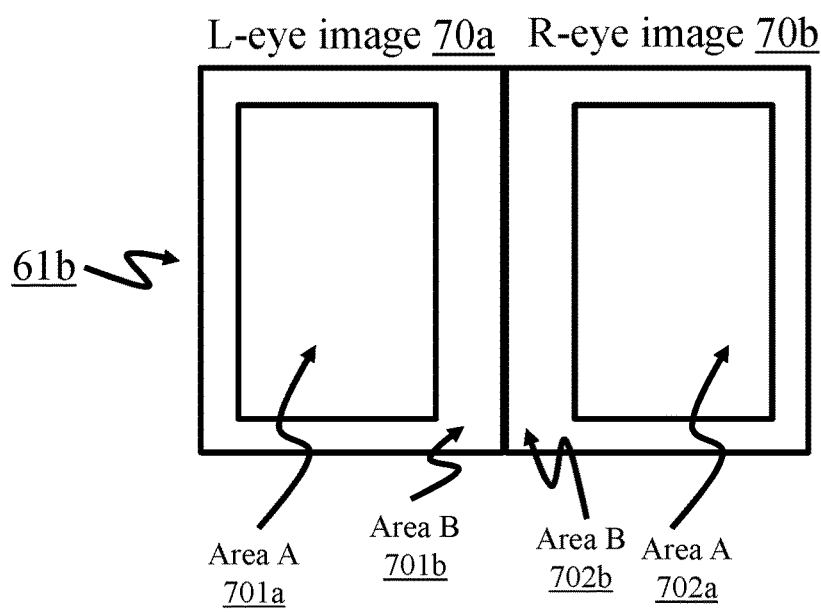

FIGS. 7a-c show how areas A and B are defined in the display zone of the single flexible display 61a. The display zone of the single flexible display 61a is divided in two image zones, one zone for each eye; a left-eye image zone 70a, and a right-eye image zone 70b. Each of the two image zones has its own areas A and B; area A 701a and area B 701b for image zone 70a, and area A 702a and area B 702b for image zone 70b.

In FIGS. 3c, respectively 5c, respectively 7c, area A 301 respectively area A 501 respectively areas A 701a/702a is/are depicted as a rectangle with angles of 90 degrees. According to an embodiment, area A 301 respectively area A 501 respectively areas A 701a/702a may be (a) rectangle(s) with round edges. According to an embodiment, area A 301 respectively area A 501 respectively areas A 701a/702a may have another form, for example an elliptical form. Area B 302 respectively area B 502 respectively areas B 701b/702b may follow(s) the contours of area A 301 respectively area A 501 respectively areas A 701a/702a.

According to an embodiment (not shown), the flexible display device(s) is (are) inserted via (a) slot(s) configured in the top or in the bottom of the HMD. According to an embodiment (not shown) the one or more flexible display devices, may be bend into, for example, one of the previously forms once inserted into the HMD. According to an embodiment (not shown), the HMD may therefore force (constrain) the flexible display device(s) to take a desired form after insertion in the one or more slot(s), for example through a spring-actuated lever mounted on the HMD which, when operated by the user, applies a mechanical pressure to a mold or pads configured to bend the flexible display(s) into the desired form.

As shown previously, the image area B surrounds the area A and the image to be displayed in area B may not require as much details as an image displayed in area A, since area B corresponds to the peripheral FOV area in which the human eye cannot observe detailed information. However, because the human eye is highly sensitive to frequential details (movement) in its peripheral FOV, image area B may therefore include frequential details. Image processing features for area A and B may therefore differ as will be discussed further on. For example, area A is left unchanged in terms of processing or an un-distortion algorithm is applied to area A (the image processing feature is applying an un-distortion algorithm), while area B is smoothed (the image processing feature is applying smoothing), typically with gaussian, median or average filtering (the image processing feature is applying filtering). Increased smoothing or even plain smoothing of area B may be applied to edges of the image; e.g., weighted by the distance between the limit between area A and area B and the edge of the image or no smoothing on limit between area A and area B but plain smoothing near the edge of area B/near the edge of the image. The strength of the filter may be a function of the distance in the area B, for example: at the start of area B (i.e., position (0, y) of the image, y>yA with yA being the start of area A according to vertical axis, raster scan), the filter strength is high or at maximum, while at the end of area B (i.e., position (xA, y) with xA being the start of area A) filter strength is low or minimum. For example, area B of the original image is replaced by an extension of the image in area A borders (the image processing feature is pixel replacement/pixel extension), e.g., pixels outside area A border take the value of the closest border pixel, or area B is a mirror of area A (the image processing feature is mirroring).

Figure 8A:
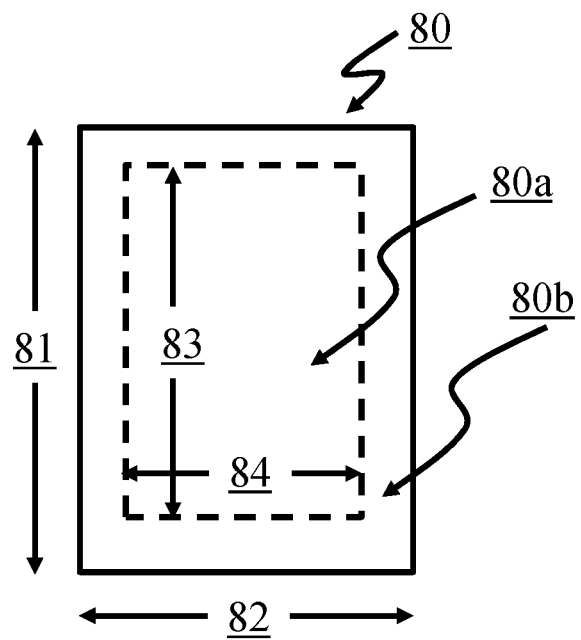
FIG. 8a/b illustrate a particular embodiment of image processing that is differentiated according to area.
Figure 8B:
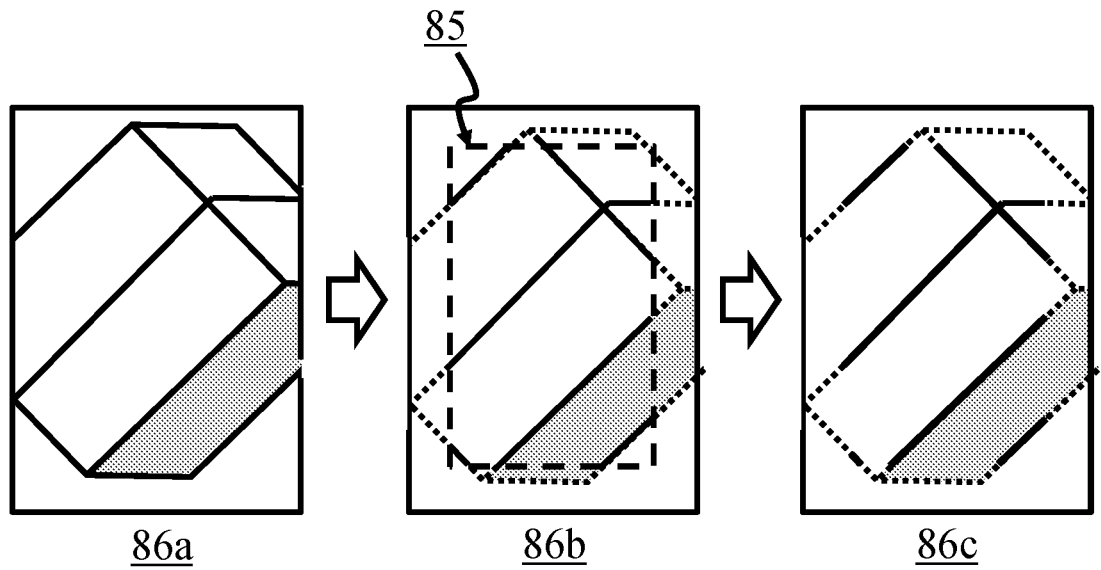

FIG. 8a/b illustrate a particular embodiment of image processing that is differentiated (is different, differs) according to display area. In FIG. 8a, an image 80 has a perimeter that is defined by an image height 81 and an image width 82. Inside the perimeter of the image 80, a focal zone 80a can be defined having a height 83 and a width 84. The zone outside the focal zone is for example a zone in peripheral FOV and is indicated by reference 80b. The part of the image 80 that is in the focal zone 80a may be processed differently than the part that is outside of the focal zone (80b). FIG. 8b is an example result of such different processing. In 86a, an image of a 3D cube is shown. In 86b, the image is shown together with the perimeter 85 of the focal zone. The image in the focal zone 80a is processed with a high level of detail (high spatial and/or temporal resolution, high bit rate) while the image in outside the focal zone (80b)

is processed with a low (lower) level of detail (low (lower) spatial and/or temporal resolution, low (lower) bit rate). The resulting image is indicated with reference 86c. According to an embodiment, focal zone 80a corresponds to the previously mentioned area A of a flexible display device, and 80b corresponds to area B.

Figure 9A:
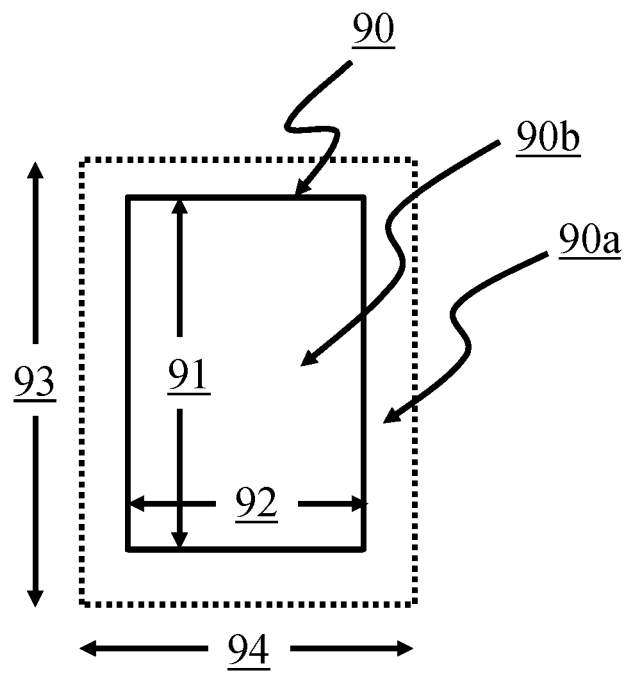
FIG. 9a/b illustrates another particular embodiment of image processing that differentiated according to area.
Figure 9B:
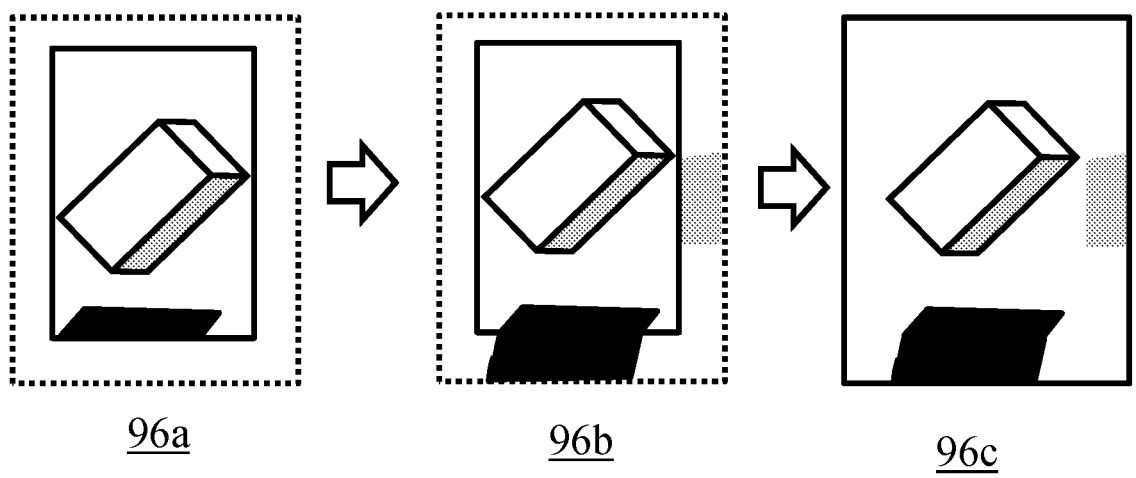

FIG. 9a/b illustrates another particular embodiment of image processing that differentiated according to area. In FIG. 9a, an image 90 to be displayed is defined by an image height 91 and image width 92. While the image zone of the image can be defined as indicated by reference 90b, outside of (around) the perimeter of the image 90 a zone 90a can be defined having a height 93 and a width 94; this zone will be further referred to as extension zone 90a. In FIG. 9b, reference 96a is an image of a 3D cube with its shadow, depicted with the perimeter of the image extension zone 90a, indicated with broken lines. Reference 96b gives a simple example of how outer parts of image 90 (parts of the image that are in the peripheral zone of the image) are used to compute an image for the image extension zone 90a. Reference 96c depicts the resulting image. According to an embodiment, the image zone 90b corresponds to the previously mentioned area A of a flexible display device, and extension zone 90a corresponds to area B. According to an embodiment, the image for area B is computed from the image to be displayed in area A based on data extracted from the outer zones of the image to be displayed in area A.

Figure 10A:
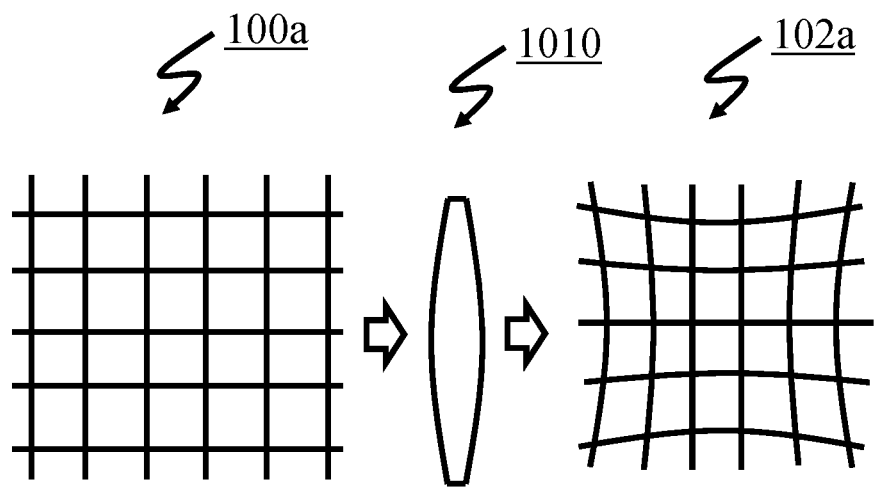
FIG. 10a illustrates a visual distortion of an image displayed on a flexible display device that may be observed by a user of an HMD equipped with one or more lenses.

FIG. 10a illustrates a visual distortion of an image displayed on a flexible display device that may be observed by a user of an HMD equipped with one or more lenses (e.g., one for each eye, or several lenses for each eye). Reference 100a is an image as displayed. Reference 101 is a lens. Reference 102a is a distorted image as observed by the user through lens 101. The distortion shown corresponds to a pincushion distortion. Other distortions may be caused by the HMD's lens(es) and distortions may be cumulative.

Figure 10B:
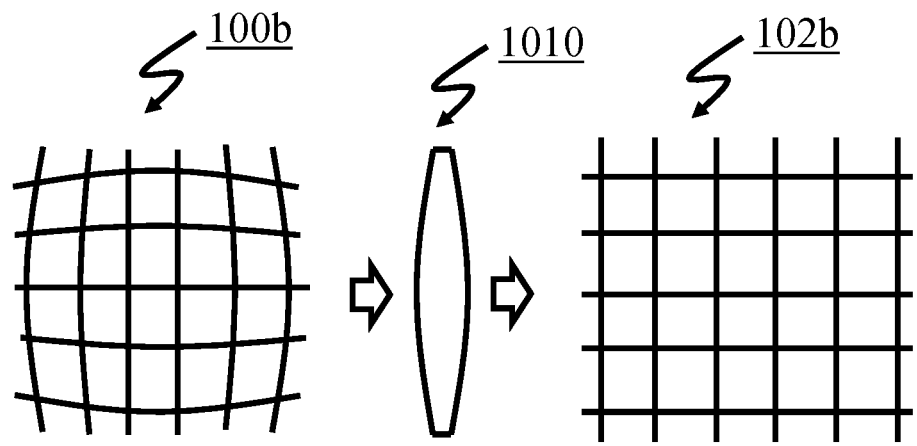
FIG. 10b illustrates how the distortion of FIG. 10a may be corrected.

FIG. 10b illustrates how the distortion of FIG. 10a may be corrected. The image 100b is deformed by applying a so-called warping translation during the processing of the image. The warping transformation corresponds to the inverse of the distortion and reduces or cancels the distortion caused by lens 101. Here a pincushion distortion 102a is illustrated, of which the inverse is a barrel distortion 100b. The resulting image 102b as observed by the user is corrected. The parameters of the warping transformation that is to be applied to the image by image processing is dependent on the features (characteristics, parameters, properties) of the lens(es) used. According to an embodiment, the image processing for the warping transformation is only applied to the image/part of the image that is to be rendered in area A, and thus not to area B, since area B, as mentioned, corresponds to the user's peripheral FOV, where the human eye cannot distinguish detailed information. This advantageously reduces image processing effort required for rendering of the image/part of the image that is to be rendered in area B. Distortion correction can be, for example, implemented using the Brown-Conrady model is not further explained here. Other type of corrections, such as chromatic aberration correction, can also be applied to further improve the image quality. Typical lens features (characteristics, parameters, properties) that may help to define the image processing steps that may correct the image distortion caused by (a) lens(es) are lens field of view, used by a 3D renderer to set virtual camera FOV; parameters that qualify the pincushion distortion or that qualify the parameters of the corresponding barrel distortion image processing operation for correction of the pincushion distortion; R, G and B channel coefficients for chromatic aberration correction. Other lens features may help to define other image processing steps to further improve image quality.

According to an embodiment, a HMD is associated with a Quick Response (QR) code which, when read by a QR code reader application in the flexible display device(s) that will use (will be inserted into) the HMD, enables the(se) flexible display device(s) to obtain the characteristics (features, parameters, properties) of the HMD, that will enable the flexible display device(s) to define and configure the image processing features that are useful for rendering images on the flexible display device(s) in that HMD. The HMD characteristics may be specified, for example, in terms of lens features, in terms of flexible display curvature, and in terms of dimension of areas A and B. According to an embodiment, such QR code is associated with (e.g., printed, stamped on) the HMD. According to an embodiment, the QR code can be obtained from a web page based on, for example, a selection of an HMD in a listing of HMDs, or on an HMD type/model number. According to an embodiment, the characteristics may comprise multiple sets of characteristics where each set of characteristics is associated with a particular flexible display device. For example, a same HMD may be capable of receiving flexible display devices of several formats (e.g., 4 inch-5.5 inch). For example, a same HMD may receive a flexible display device 21a which will be constrained, once inserted into the HMD, to take the form 21b of FIG. 3b, or, if the flexible display device has a larger format, to take the form 61a of FIG. 7b. For example, a same HMD may receive one flexible display device (FIGS. 2-3 and 6-7), or two flexible display devices (FIGS. 4-5). A same HMD may receive one flexible display device in landscape orientation, or two flexible display devices in either landscape or portrait orientation. The image processing features for the flexible display device(s) to be used with an HMD may therefore depend on both the characteristics of the HMD, type of flexible display device(s) used, whether one or two flexible display devices are used and the orientation of the flexible display devices. While landscape or portrait orientation of display devices may be detected by the display device itself, auto-display orientation is inconvenient because of its unwanted effects caused by head movement when the display device is used in an HMD.

According to an embodiment, the HMD may communicate its characteristics to the flexible display device(s) that will use the HMD via wireless transmission means such as Wi-Fi, Bluetooth, or near-field communication (NFC). For example, the flexible display device may read the characteristics by reading an NFC tag incorporated in the HMD. According to an embodiment, the HMD user may specify the way how the HMD is to be used (single/multiple flexible display device, flexible display orientation) and the flexible display device(s) may, based on these information sources determine the size of areas A and B, and which image processing features to apply to images displayed in each area.

According to an embodiment, features of areas A and B such as dimension and x-y position may be user (wearer) definable, or user (wearer)-adjustable. According to an embodiment, areas A and B may be centered according to the HMD wearer's interpupillary distance (IPD or PD for pupillary distance). IPD is a wearer-specific parameter that may be measured by a sensor element that may help to measure parameters such as displacement, distance, position (e.g., a camera) in the flexible display device before or after insertion of the flexible display device into the HMD. Alternatively, IPD may be determined by the HMD based on, for example, measurement of head circumference that can be obtained from measurement by the HMD of headband length when adjusted automatically by the HMD or manually by the wearer, or from measured tear intensity applied on the headband mounting(s) of the HMD e.g., when the headband is of a one-size-fits-all type. Alternatively, IPD may be preconfigured based on, for example, the HMD wearer's age as specified by the HMD wearer; for example, IPD may be set to 6.3 cm if the wearer is an adult or 5.1 cm if the wearer is a child.

According to an embodiment, features of areas A and B may be also adjusted as a function of eye-to-display distance. Eye-to-display distance may be a parameter that is specific for each HMD. A pre-configuration may include obtaining the above-mentioned wearer-specific parameters, obtaining HMD parameters, obtaining usage configuration of the HMD (e.g., one display, two displays, portrait or landscape display orientation), and obtaining parameters of the flexible display device(s) that is(are) to be used with the HMD (e.g., screen dimensions, number of pixels). The pre-configuration may determine the dimensions and positioning of areas A and B, and the different image processing features associated with each of these areas.

Figure 11:
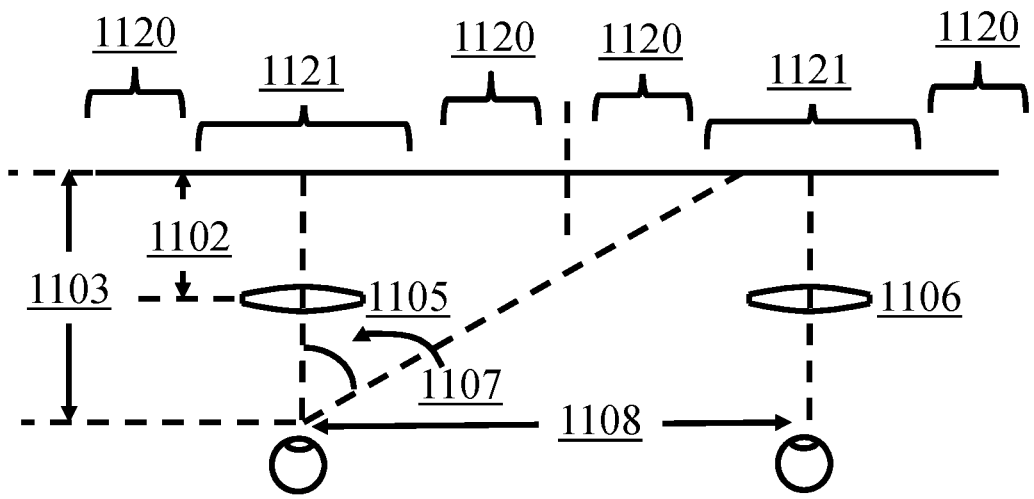
FIG. 11 is a diagrammatic presentation that illustrates the determination of areas A and B for a single flexible display device.

FIG. 11 is a diagrammatic presentation that illustrates the determination of areas A and B for a single flexible display device. A and B can be defined from, for example the following characteristics (parameters, properties):

f, representing lens focal length of the lens system in the HMD;

$d_{IPD}$, reference 1108, representing interpupillary distance (in cm) of the user;

$d_{ETS}$, reference 1103, representing eye-to-display distance (in cm) of the HMD;

$d_{STL}$, reference 1102, representing display-to-lens distance (in cm) of the HMD;

$w_A$, reference 1121, representing width in pixels of area A for the flexible display device used;

α, reference 1105, representing angle between the head coronal plane (i.e., a plane defined from ear-to-ear) and the exterior visual boundary of the eye (i.e., the exterior limit of binocular vision) of the user. Typically, this angle is 62°, i.e., approximately π/3, and can be considered a fixed value, while in case the image displayed in the HMD is responsive to head movement (i.e., inducing a translation according to head movement) this angle may be adjusted to 30 or 20° which corresponds to the bounds for the eye to recognize symbols or colors;

ppcm, representing pixel density in pixels (RGB triplet) per centimeter of the flexible display device used. Typically, 150-200 for a full High Definition (HD) display.

Assumed that the flexible display device is centered in the HMD, i.e., the center of the HMD and center of the display are aligned, and assuming that binocular vision in the horizontal plane is generally possible from the range of −62° to +62° where 0° is the straight forward direction of view (perpendicular to the ear-to-ear plane):

$$w_A = (2 \cdot \tan(\alpha) \cdot d_{ETS} + d_{IPD})/(f/(f-d_{STL})) \cdot ppcm$$

As an example, considering α=62°, $d_{ETS}$=2 cm, $d_{STL}$=0.5 cm, ppcm=150, f=3.5 cm ➔ $w_A$ (pixel width of area A)=1000 pixels. With the pixel width of area A 1121 known, the pixel width of area B 1120 can be computed as being the pixel width of the flexible display/4. In the above example, only width has been computed. For computation of height, preservation of the aspect ratio of the processed image may be used to determine it where:

Aspect ratio=height/width=tan(vertical FOV/2)/tan (horizontal FOV/2)

where horizontal FOV/2=a, width=$w_A$ and aspect ratio is typically equal to 16/9 or ¾; aspect ratio can be retrieved from the image or display characteristics.

Alternatively, the height of area A is equal to the height of the processed image (i.e., consequently the thickness of area B's 'frame members' 120a, 120b (see FIG. 12) may be zero).

When the surface of area B is not a simple rectangle and is for example an elliptical form, $w_A$ defines the width of the ellipse on its major axis.

Figure 12A:
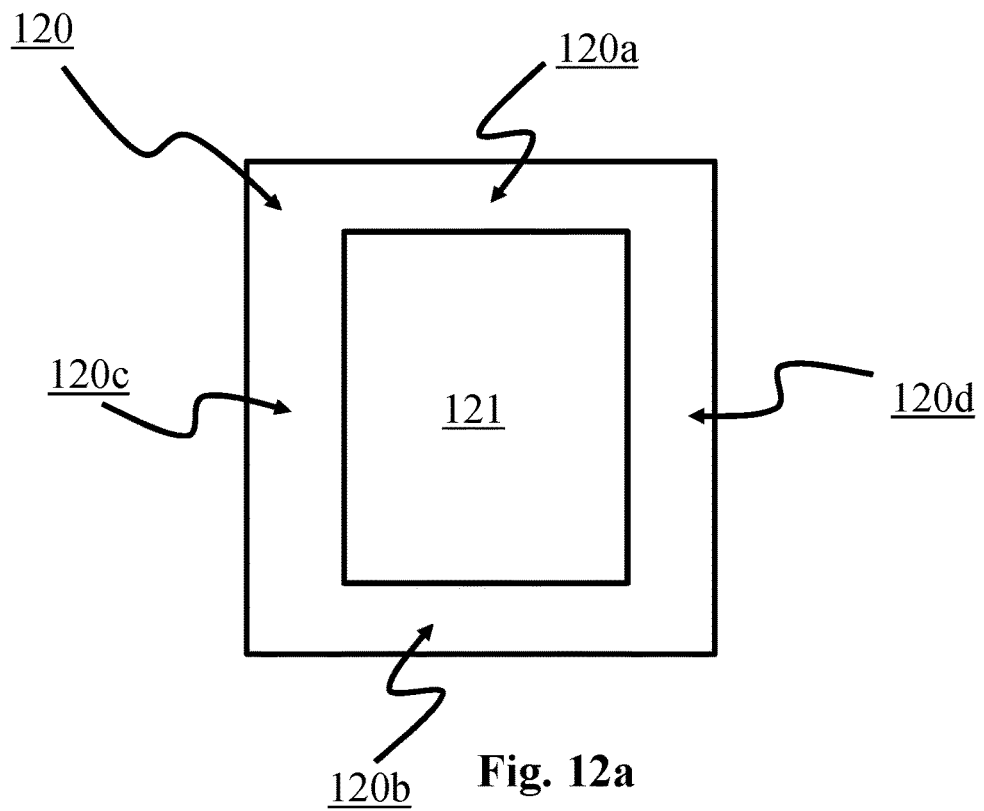
FIG. 12 is a diagrammatic presentation of areas A and B for reference purposes.
Figure 12B:
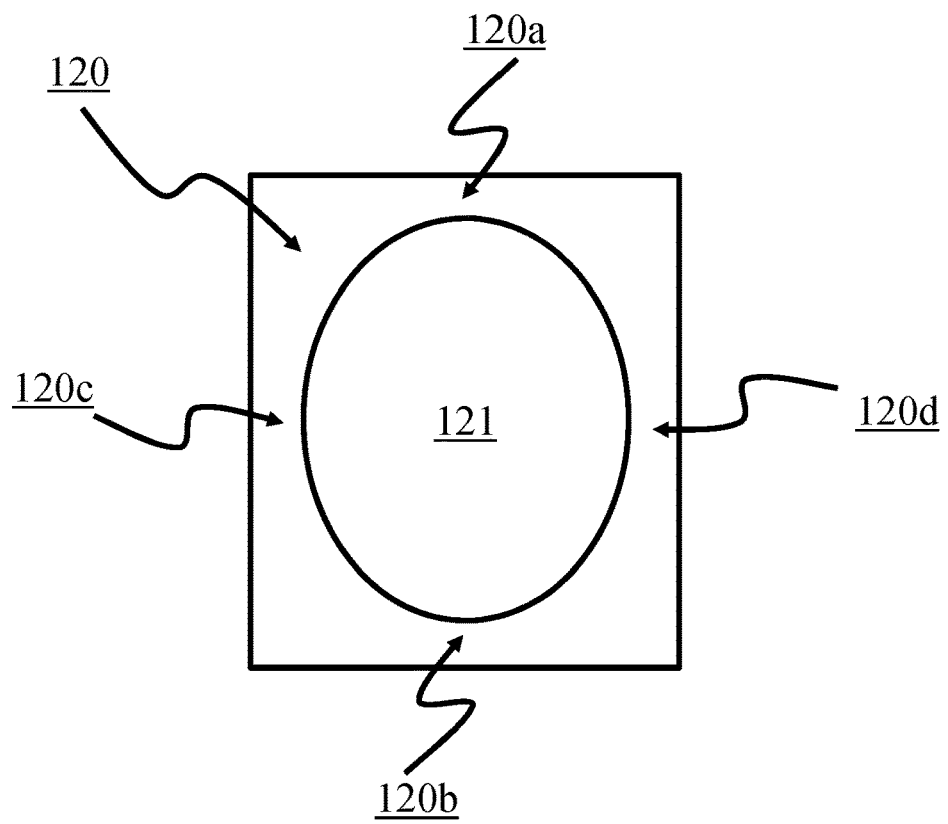

FIG. 12 is a diagrammatic presentation of areas A and B for reference purposes. A display area of a flexible display device may be defined by the outer rectangle. In FIG. 12a, area A 121 is the inner rectangle and area B 120 can be represented as being a frame around area A 121. The 'frame' of area B has an upper member 120a, a lower member 120b, a left member 120c and a right member 120d. The upper, lower, left and right members may have a same, different or variable thickness. The thickness of frame members may be zero at least at some points of the frame member. In FIG. 12a areas A and B are represented as two rectangles in a portrait orientation. However, areas A and B may have a landscape orientation, and the orientation of areas A and B may be different, e.g., area A may have a landscape orientation, while area B has a portrait orientation or vice versa. Areas A and B may not be of rectangular form but, for example, at least partly having a circular of elliptical form, and areas A and B may combine any of these forms, for example, while area B is a frame with an outside rectangular form, its inside form may be at least partly elliptical, if area B is at least partly of elliptical form, such as, for example, depicted in FIG. 12b.

Figure 13:
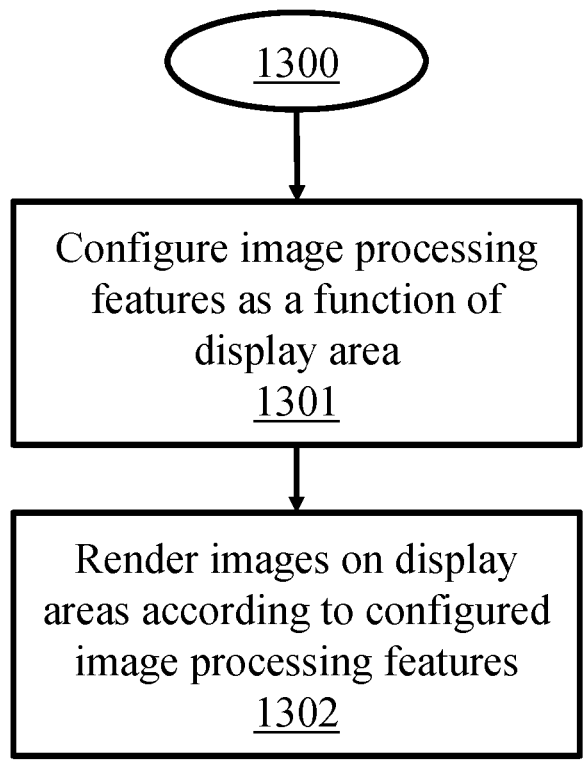
FIG. 13 is a flow chart of an embodiment of the method for rendering images on a flexible display device in an HMD.

FIG. 13 is a flow chart 1300 of an embodiment of the method for rendering images on at least one flexible display device in a head-mountable device.

In a first step 1301, image processing features for images to be rendered on the at least one flexible display device as a function of a first display area of the at least one flexible display device and a second display area of the at least one flexible display device on which the images are to be rendered, the second display area surrounding the first display area, and the first display area corresponding to a focal field of view and the second display area corresponds to a peripheral field of view. Example image processing features are processing with high or low spatial and/or temporal resolution, smoothing, applying filtering, pixel replacement, copying, image extension.

In a step 1302, images are rendered on the first and second display areas of at least one flexible display device once inserted in said head-mountable device according to the configured image processing features. The images may be frames of a video sequence.

Figure 14:
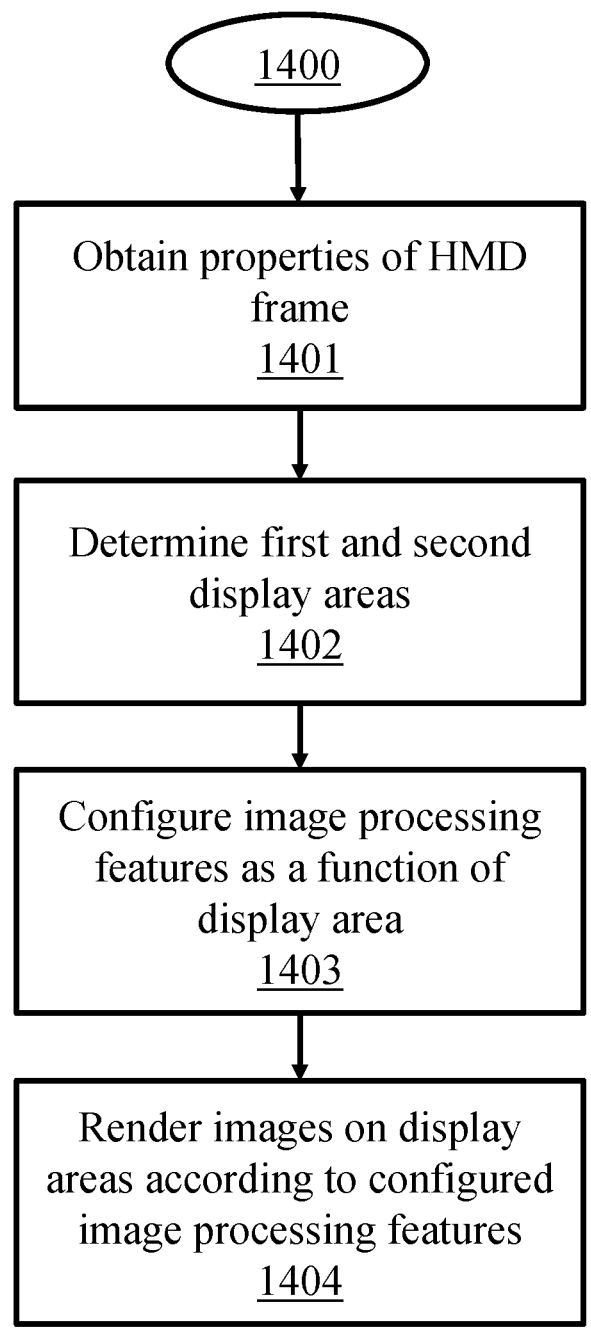
FIG. 14 is a flow chart of a different embodiment of the method for rendering images on a flexible display device in an HMD.

FIG. 14 is a flow chart 1400 of a different embodiment of the method for rendering images on at least one flexible display device in a head-mountable device.

In a first step 1401, properties of the HMD are obtained from the HMD. These properties may include, for example, characteristics related to lenses used in the HMD such as focal distance (length), lens distortion, chromatic aberration, lens FOV, but also interpupillary distance if measured by the HMD, display-to-lens distance, eye-to-display distance, possible landscape/portrait orientation(s) of the flexible display device when inserted in the HMD, curvature of the flexible display device when inserted in the HMD.

In a step 1402, based on the properties obtained in step 1301, a first display area (e.g., area A) and a second display area (e.g., area B) are determined for rendering of images on the flexible display device. The second display area surrounds the first display area (e.g., area B can be seen as a frame around area A), and the first display area corresponds to a focal field of view of the human eye and the second display area corresponds to a peripheral field of view of the human eye.

In a step 1403, image processing features are configured for images to be rendered on the flexible display as a function of the display area (e.g., area A or B) in which the images are to be rendered. Example image processing features are processing with high or low spatial and/or temporal resolution, smoothing, applying filtering, pixel replacement, copying, image extension.

In a step 1404, images are rendered on the first and second display areas of at least one flexible display device once inserted in the head-mountable device according to the configured image processing features. The images may be frames of a video sequence.

Figure 15:
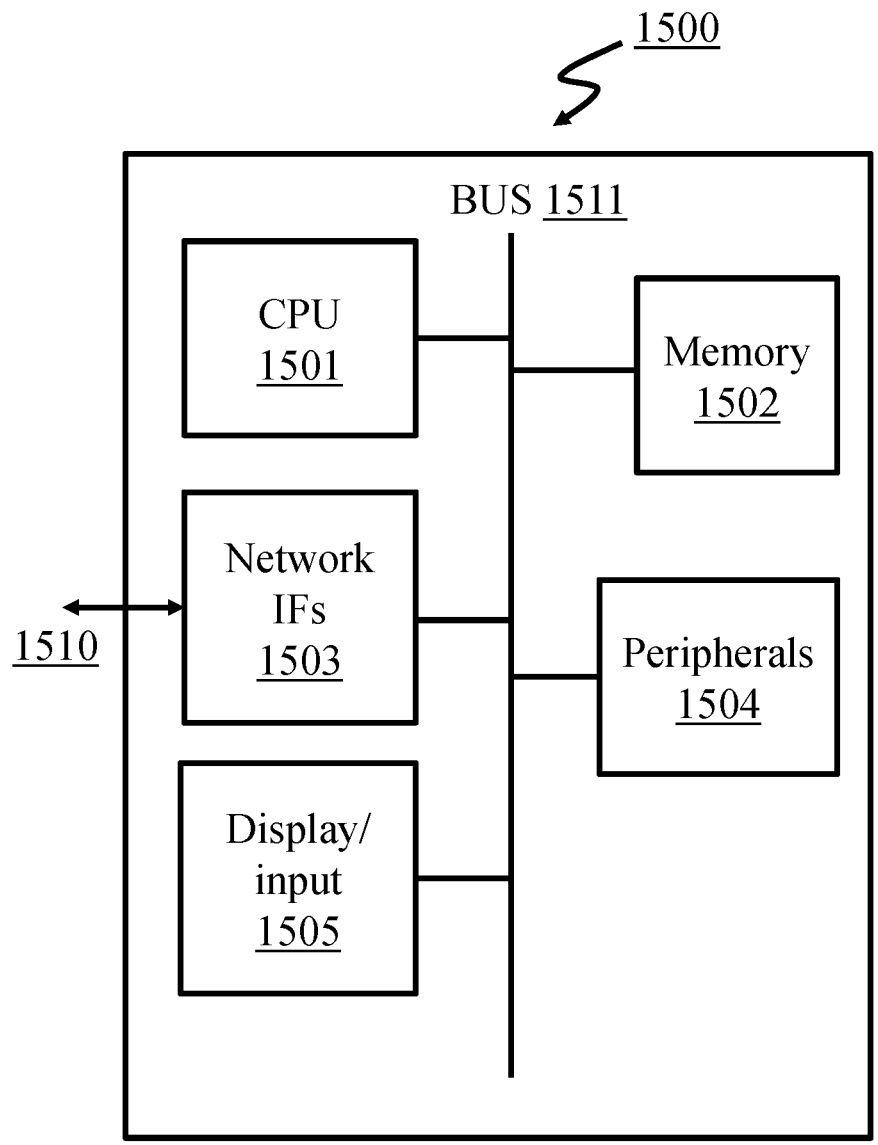
FIG. 15 is an example embodiment of a flexible display device.

FIG. 15 is an example embodiment of a flexible display device. The display device 1500 comprises, at least one processor 1501 configured to execute the steps illustrated in FIG. 13. The flexible display device may further comprise a memory 1502 that may be configured to store data such as images before and after image processing, image processing feature configuration settings, properties of an HMD, definitions of areas A and B, as well as instructions that are executable by the processor 1501. One or more network interfaces 1503 may be configured to interface with a wireless network 1510 such as 3G-5G/NR, NFC, Bluetooth, or WiFi, and may be for example, configured to read properties of an HMD, to connect to other devices, to a LAN, a WAN, to the Internet. One or more peripherals 1504 may be configured to read a Quick Response code of an HMD, in which case the peripherals include a sensor, for example a camera device. A display/input 1505 may be configured to render images and to receive user input.

It is to be appreciated that some elements in the drawings may not be used or be necessary in all embodiments. Some operations may be executed in parallel. Embodiments other than those illustrated and/or described are possible. For example, a device implementing the present principles may include a mix of hard- and software.

It is to be appreciated that aspects of the principles of the present disclosure can be embodied as a system, method or computer readable medium. Accordingly, aspects of the principles of the present disclosure can take the form of an entirely hardware embodiment, an entirely software embodiment (including firmware, resident software, micro-code and so forth), or an embodiment combining hardware and software aspects that can all generally be defined to herein as a "circuit", "module" or "system". Furthermore, aspects of the principles of the present disclosure can take the form of a computer readable storage medium. Any combination of one or more computer readable storage medium(s) can be utilized.

Thus, for example, it is to be appreciated that the diagrams presented herein represent conceptual views of illustrative system components and/or circuitry embodying the principles of the present disclosure. Similarly, it is to be appreciated that any flow charts, flow diagrams, state transition diagrams, pseudo code, and the like represent various processes which may be substantially represented in computer readable storage media and so executed by a computer or processor, whether such computer or processor is explicitly shown.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information there from. A computer readable storage medium can be, for example, but is not limited to, an electronic, magnetic, optical, electromagnetic, infrared, or semiconductor system, apparatus, or device, or any suitable combination of the foregoing. Some or all aspects of the storage medium may be remotely located (e.g., in the 'cloud'). It is to be appreciated that the following, while providing more specific examples of computer readable storage mediums to which the present principles can be applied, is merely an illustrative and not exhaustive listing, as is readily appreciated by one of ordinary skill in the art: a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing.

The invention claimed is:

1. A method for rendering images on a first device comprising a flexible display in a head-mountable second device, wherein the method comprises:
    the first device comprising a first display area and a second display area, the second display area being outside the first display area;
    rendering images on the first and on the second display areas according to image processing features as a function of the first display area and as a function of the second display area, wherein the image processing features as a function of the first display area are different from the image processing features as a function of the second display area, the first display area corresponding to a focal field of view and the second display area corresponding to a peripheral field of view.

2. The method according to claim 1, wherein the second device comprises an opening configured for inserting the first device, the second device constraining the flexible display to take a curved form when the first device is inserted into the second device.

3. The method according to claim 2, the method further comprising determining dimensions and position of the first display area and of the second display area as a function of dimensions of the flexible display and of the curved form.

4. The method according to claim 2, wherein the image processing features comprise at least one of:
    applying higher spatial and/or temporal resolution image processing to images to be rendered on the first display area than for images to be rendered on the second display area;
    applying a warping transformation to images to be rendered on the first display area as a function of the curved form, to correct a distortion caused by lenses in the second device, and not applying the warping transformation to images to be rendered on the second display area;
    extending images to be rendered on the first display area to the second display area, by extraction of image features from outer display zones of the images to be rendered on the first display area.

5. The method according to claim 3, wherein the dimensions and position of the first display area and of the second display area are further a function of any of:
- a focal length of a set of lenses comprised in the second device;
- a focal center distance between a set of lenses comprised in the second device;
- an eye to display distance;
- a display to lens distance;
- an interpupillary distance.

6. The method according to claim 5, wherein the interpupillary distance is measured by the first device based on a sensor element in the first device.

7. A first device comprising a flexible display, for rendering images when inserted in a head-mountable second device, the first device comprising:
- a first display area and a second display area, the second display area being outside the first display area; and
- at least one processor configured to render images on the first and on the second display areas according to image processing features as a function of the first display area and as a function of the second display area, wherein the image processing features as a function of the first display area are different from the image processing features as a function of the second display area, the first display area corresponding to a focal field of view and the second display area corresponding to a peripheral field of view.

8. The first device of claim 7, wherein the second device comprises an opening configured for inserting the first device, the second device constraining the flexible display to take a curved form when the first device is inserted into the second device, the at least one processor being further configured to determine dimensions and position of the first display area and of the second display area as a function of dimensions of the flexible display and of the curved form.

9. The first device according to claim 8, wherein the at least one processor is further configured to apply at least one of the following image processing features:
- apply higher spatial and/or temporal resolution image processing to images to be rendered on the first display area than for images to be rendered on the second display area;
- apply a warping transformation to images to be rendered on the first display area as a function of the curved form, to correct a distortion caused by lenses in the second device, and not apply the warping transformation to images to be rendered on the second display area;
- to extend images to be rendered on the first display area to the second display area, by extraction of image features from outer display zones of the images to be rendered on the first display area.

10. The first device according to claim 7, wherein the at least one processor is further configured to obtain an interpupillary distance from a user of the second device, for determining a center position of the first display area.

* * * * *